Oct. 22, 1963    W. L. WEAKLEND    3,107,877
WIRE WINDING APPARATUS
Filed May 29, 1961    2 Sheets-Sheet 1
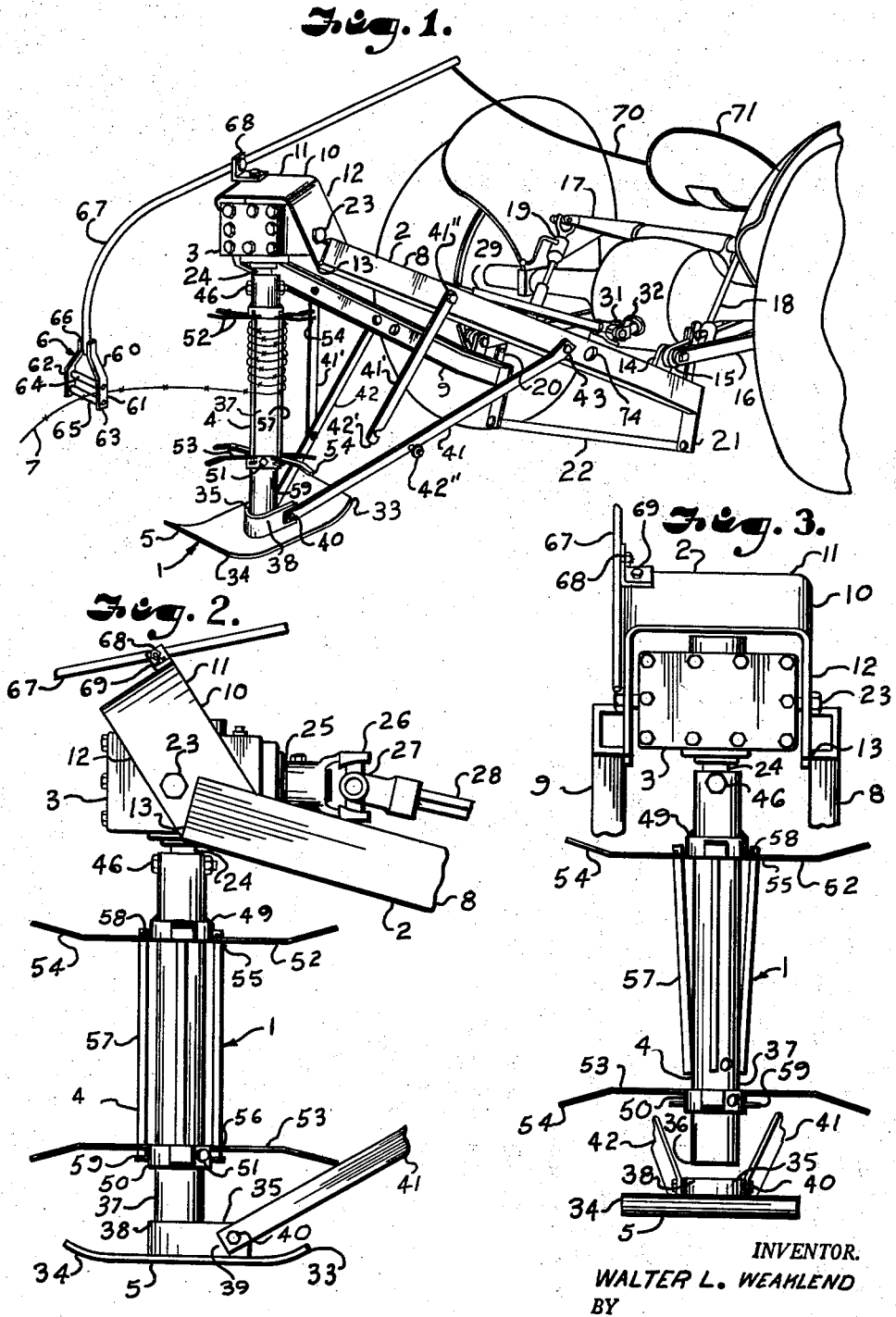
INVENTOR.
WALTER L. WEAKLEND
BY
*Fishburn & Gold*
ATTORNEYS Oct. 22, 1963    W. L. WEAKLEND    3,107,877
WIRE WINDING APPARATUS
Filed May 29, 1961    2 Sheets-Sheet 2
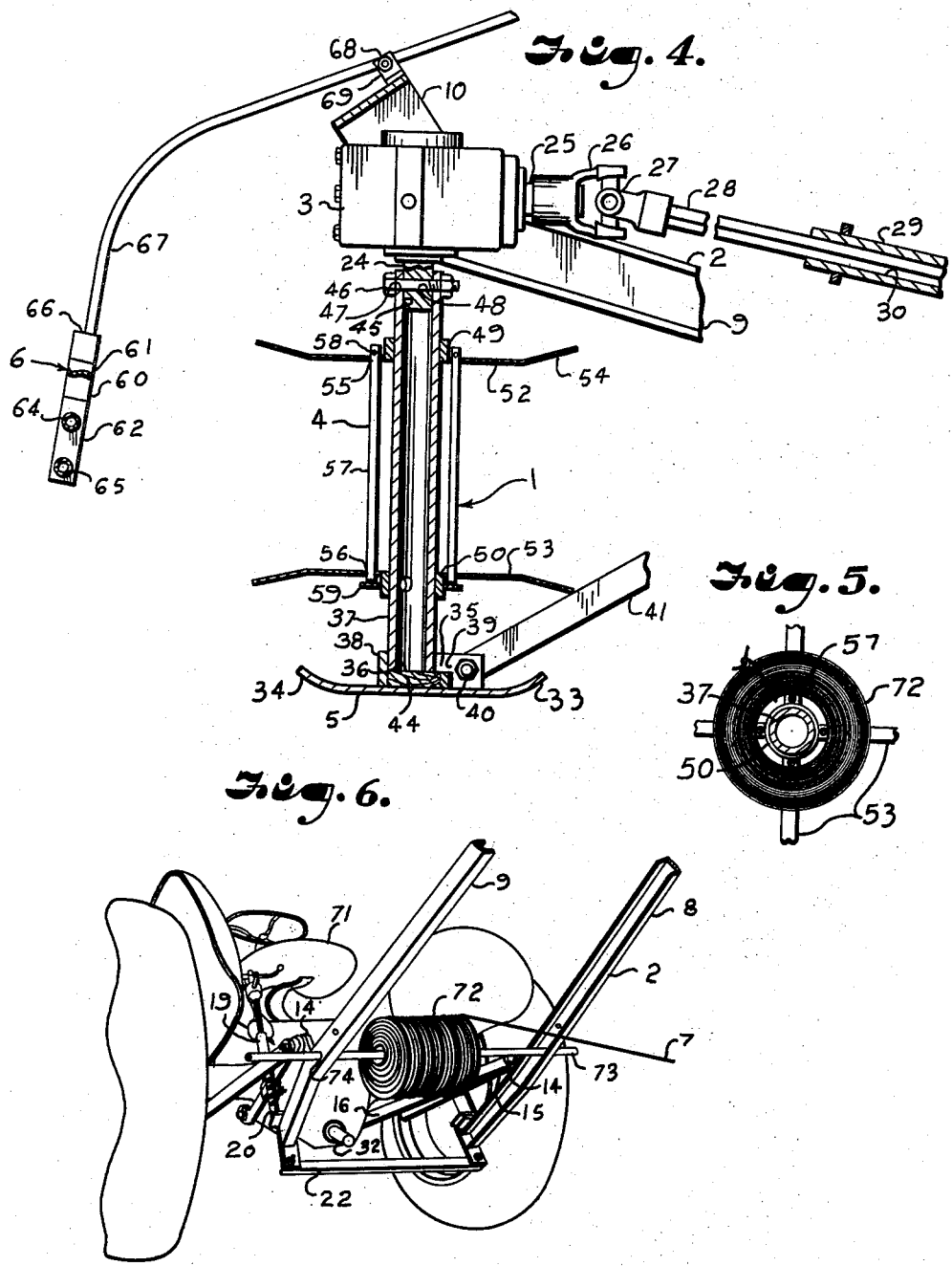
INVENTOR.
WALTER L. WEAKLEND
BY
Fishburn & Gold
ATTORNEYS

United States Patent Office 3,107,877
Patented Oct. 22, 1963

3,107,877
WIRE WINDING APPARATUS
Walter L. Weakland, Smithville, Mo.
(R.F.D. 29, Kansas City, Mo.)
Filed May 29, 1961, Ser. No. 113,390
8 Claims. (Cl. 242—86.5)

This invention relates to wire winding apparatus, and more particularly to apparatus for winding lengths of wire strung out along the ground.

It is common practice in replacing wire fence such as barbed wire fences and the like to remove old wire and throw it on the ground, proceed to string new wire and secure it to posts, and then later endeavoring to remove the barbed wire on the ground. The removal of the wire after it is thrown out on the ground is difficult as it frequently becomes tangled and, if left, it presents a hazard to animals in the fenced area. The present invention contemplates a structure wherein the wire, when removed from the posts, may be wound into a coil that is easily handled for disposal.

The principal objects of the present invention are to provide a real structure supported in close proximity to the ground and that is power driven to wind the wire on the reel; to provide a wire winding attachment for tractors wherein a frame is pivotally mounted on the tractor with a gear box on the frame and a reel attached to the output shaft of the gear box and in depending relation thereto with power connections with the tractor for rotating the reel; to provide such a structure with a ground-engaging base plate having a socket for the lower end of the reel structure whereby said reel is supported to withstand substantial tension on the wire being wound; to provide such a structure wherein the reel includes a spindle with end portions thereon with spaced members carried by the end portions in spaced relation to the spindle with said members releasable at one end to collapse inwardly and facilitate removal of a coil of wire wound thereon; to provide such a structure wherein power for rotating the reel is applied by the tractor; to provide such a structure wherein the frame is pivotally mounted on the tractor for up and down swinging movement whereby the lower end of the reel carrying spindle is separable from the socket and the base plate; to provide such a structure with guide means carried on the frame and selectively movable to spool the wire being wound between the end portions of the reel; to provide such a structure with an arrangement on the frame to accommodate a spool of wire freely rotatable in response to tension on the wire for paying wire from the spool; to provide a wire winding attachment for tractors wherein the frame and gear box may be used with an auger for driving post holes and the auger removed and the reel attached to the output shaft of the gear box to wind wire on the reel; and to provide a wire winding attachment for tractors that is economical to manufacture, in a strong structure to resist accidental damage which might result from mishandling and that is efficient and positive in operation.

Other objects and advantages of this invention will become apparent from the following description taken in connection with the accompanying drawings wherein are set forth by way of illustration and example certain embodiments of this invention.

FIG. 1 is a perspective view of the wire winding apparatus mounted on the rear end of a conventional farm tractor.

FIG. 2 is a fragmentary side elevational view of the wire winding apparatus showing the parts thereof approximately in the position they occupy when winding wire on the reel thereof.

FIG. 3 is a fragmentary rear elevational view of the wire winding apparatus with the lower end portion of the reel partially removed for collapse of the wire supporting rods of the reel.

FIG. 4 is a fragmentary side elevational view of the wire winding apparatus with portions broken away to illustrate the structure of the reel and guide.

FIG. 5 is a horizontal section through the reel with wire wound thereon and tied in a coil.

FIG. 6 is a fragmentary perspective view of the frame on the rear of a tractor with a coil of wire supported on the frame for paying out wire therefrom.

Referring more in detail to the drawings:

1 designates a wire winding apparatus which generally includes a frame 2, a gear box 3, a reel 4 and a base plate 5 operably connected and arranged with a guide 6 whereby wire 7 may be wound on the reel 4. In the structure illustrated, the frame 2 includes a pair of laterally spaced arms 8 and 9 connected at their rear ends by a U-shaped member 10 in the form of a yoke having a transverse portion 11 and legs 12 extending downwardly and forwardly of the transverse portion 11 with said legs secured as by welding to rear end portions 13 of the arms 8 and 9. The arms are illustrated as being in the form of channel members; however, it is to be understood that they may be of any geometric shape in cross section and preferably are of standard structural shapes. The arms 8 and 9 extend forwardly from the yoke 10 in slightly diverging relation, and have ears 14 which are pivotally connected as at 15 to lift arms 16, said lift arms being standard apparatus on tractors, with the manner in which they are controlled by the operator being well known to those versed in the art. The tractor lift arms 16 are hinged to the rear of the tractor for up and down movement and can be raised and lowered at will through suitable linkage powered by the tractor hydraulic system. In the structure illustrated, arms 17 are actuated by the hydraulic system of the tractor and said arms 17 are connected by links 18 and 19 to the lift arms 16 intermediate the connections thereof to the rear of the tractor and the ears 14. The forward end portions of the arms 8 and 9 are connected by a bracket 20 with the lift arms 16 and are preferably adjustable relative thereto to vary the inclination of the frame relative to the lift arms 16. With this arrangement, rotation of the arms 17 around their pivotal mounting to the hydraulic means will raise and lower the lift arms 16, and thus raise and lower the arms 8 and 9 of the frame 2. It is preferred that the forward ends of the arms 8 and 9 have depending legs 21 connected by a transverse member 22 to form a stop and support when the frame 2 is lowered by downward movement of the lift arms 16 to serve as a limit to downward swinging movement of said frame.

The gear box 3 is arranged between the legs 12 of the yoke 10 and is pivotally connected to said legs by shoulder bolts 23, which extend through journal apertures in the legs 12 and have their ends received in internally threaded apertures in the side walls of the gear box whereby said bolts serve as trunnions on which the gear box is adapted to turn about the horizontal axis. The gear box has an output shaft adapted to be substantially vertical with said shaft 24 journalled in the upper and lower walls of the gear box. The lower end of the shaft 24 preferably is polygonal in shape to form a driving connection with the reel 4, as later described. Within the gear box 3, the output shaft 24 is operatively connected by means of a pair of meshing bevel gears (not shown) to a horizontal or input shaft 25 suitably journalled in and projecting through the front wall of the box. The projecting portion of the input shaft 25 has secured thereto a yoke 26 of a universal joint 27 which connects same to a square or polygonal shaft 28 which extends generally downwardly and forwardly from the gear box 3. The forward portion of the polygonal or square shaft 28 is telescopically received in a tube 29 having a bore 30 conforming in cross sectional shape to the cross section of the polygonal shaft 28. The tube 29 is coupled at its forward end by a similar universal joint 31 to the power take-off output shaft 32 of the tractor. The telescoping arrangement between the two members 28 and 29 forms an extensible drive shaft between the two universal joints 27 and 31, and the universal joints accommodate themselves to changes in the angular aspect of the drive shaft relative to the horizontal as the frame is raised and lowered, and operation of the power take-off of the tractor will drive the telescoping drive shaft to rotate the input shaft 25 of the gear box 3 which in turn drives the output shaft 24.

The base plate 5 is preferably formed of steel plate or the like with forward and rearward portions 33 and 34 turned upwardly whereby the base plate will move over the ground and not catch on obstructions during movement of the tractor from one position to another. The base plate 5 has an upwardly opening socket 35 to receive the lower end portion 36 of a spindle 37 carrying the reel 4. In the illustrated structure, the socket 35 is formed by an upstanding wall 38 fixed to the base plate with a portion curved to define a substantially semi-circular part at the rear and terminating at the sides in forwardly extending legs 39 pivotally connected by bolts 40 to arms 41 and 42 that extend upwardly and forwardly and have their forward ends pivotally connected as at 43 to the arms 8 and 9 respectively intermediate the forward and rear ends thereof. The arms 41 and 42 are selectively secured relative to the arms 8 and 9 for movement therewith by links 41' each of which preferably have one end 41" pivotally connected to the arms 8 and 9 intermediate the length thereof and the other end 42' notched to releasably engage a fastening device 42" as illustrated in FIG. 1. The links 41' are normally connected to the arms 41 and 42 only during movement of the structure to a new site. The axis of the semi-circular portion defining the socket is preferably substantially in vertical alignment with the output shaft 24, and it is preferred that a block of wood 44 or other cushioning material be placed in the lower portion of the socket to eliminate damage to the spindle when lowered into the socket.

The reel 4 in the structure illustrated includes a spindle 37 preferably formed of a tube having a bore or socket 45 at its upper end of a polygonal shape to be sleeved over the lower end portion of the output shaft 24 to form a driving connection therewith. It is also preferred that the spindle be removably secured to the output shaft 24 as by means of a bolt 46 extending through aligned apertures 47 and 48 in the tube or spindle and the output shaft respectively to form a driving key and also to connect the spindle 37 to the shaft whereby the reel will be raised and lowered with the frame 2. The reel 4 has end members 49 and 50 which include collar members, the upper end member 49 preferably being fixed to the spindle and the lower end member 50 being slidable on the spindle and removably secured in reel forming position as by means of a suitable fastening device such as a set screw 51. Each of the end members 49 and 50 have circumferentially spaced generally radially extending fingers 52 and 53 respectively to define the wire-receiving portion of the reel therebetween, the outer portions 54 of the fingers being turned outwardly in diverging relation, as illustrated in FIG. 4, to increase the spacing between the outer end portions of the fingers 52 and 53 and assure the wire passing therebetween and between the upper and lower end portion of the reel without catching on said fingers. The fingers of the upper member are vertically aligned with the fingers of the lower member with said fingers 52 and 53 having aligned apertures 55 and 56 respectively radially spaced outwardly from the spindle 37, as illustrated in FIG. 4. Reel core members such as rods 57 extend through the aligned apertures 55 and 56 with the upper end of the rods having keepers such as pins 58 above the fingers 52 to hold said fingers against downward movement relative thereto. In operative position, the lower ends of the rods extend through the apertures 56 in the fingers 53 and engage an annular flange or stop plate 59. In placing the lower reel member on the spindle, it is moved upwardly, and the lower ends of the rods 57 sleeved through the apertures 56 and when said rods engage the upper face of the flange or stop 59 the lower reel end member 50 is in proper position and is secured thereto by the fastening device 51.

The guide 6 forms a spooling guide for wire being wound on the reel and preferably consists of a stirrup-like member 60 having spaced sides 61 and 62 with vertically spaced apertures 63 to rotatably mount trunnions of spaced rollers 64 and 65 between which the wire 7 is adapted to extend. The upper ends of the sides 61 and 62 are turned inwardly and are secured as at 66 to a lever member 67 which curves upwardly and rearwardly and is pivotally mounted as at 68 on a bracket 69 secured to the yoke 10. The forward portion of the lever extends forwardly from the bracket and is preferably connected to a flexible line 70 which extends to the operator on the tractor seat 71. The weight of the stirrup end tends to swing the lever downwardly at the rear whereby the pull on the flexible line will raise the guide and as the result of the relaxing tension on the line the weight will pull the guide downwardly whereby manipulation and variation of the tension on the line will effect up and down movement of the guide to spool the wire across the width of the reel.

In using a structure constructed and assembled as described, and with the reel spindle 37 connected to the output shaft 24 with the lower end of the spindle in the socket 35, and with the links 41' connecting the arms 41 and 42 to the arms 8 and 9, the lift mechanism is operated to raise the arms, base plate 5 and reel and the tractor moved to a site where wire is to be wound. The links 41' are normally connected to the arms 41 and 42 only when the structure is being moved from one site to another. At a selected position, the lift mechanism is operated to lower the structure until the base plate 5 rests on the ground. Then the fastening devices 42" are loosened and the links disconnected from the arms 41 and 42 whereby the base plate will remain on the ground when the arms 8 and 9 with the reel are subsequently raised, as later described. The wire 7 is threaded between the rollers 64 and 65 and secured to one of the rods 57 by a loop or the like. Then, by operating the tractor power take-off, the drive shaft drives the gear box input shaft 25 to rotate the output shaft 24 rotating the reel 4 to wind the wire 7 thereon and, by pulling and relaxing the flexible line 70, the guide is moved up and down to spool the wire on the reel between the end members, the inner portion of the coil of wire formed being spaced from the spindle 37. After the wire is wound into a coil on the reel and it is desired to remove the coil from the reel, the free end of the wire is inserted through the space between the spindle and coil between the fingers 52 and 53 and rods 57 and then said end is tied, as illustrated in FIG. 5, whereby the wire end portion holds the wire against unwinding. The lift mechanism of the tractor is then operated to raise the frame 2 lifting the lower end of the spindle 37 from the socket 35. Then the fastening device 51 is disengaged from the spindle whereby the lower end member can be removed by sliding same downwardly and off the lower end of the spindle. In this movement, the lower ends of the rods 57 are released from the apertures 56 whereby said rods will collapse inwardly toward the spindle, as illustrated in FIG. 3, providing a downwardly tapered core for the reel whereby the wire coil will slide therefrom. After removal of the coil of wire from the reel, the lower end of the reel is then reapplied to the spindle and moved upwardly and arranged whereby the lower ends of the rods 57 extend through the apertures 56 and engage the stop 59. The fastening device 51 is then moved to secure the lower end portion of the reel in place. The frame 2 is then lowered whereby the lower end of the spindle is engaged with the block 44 in the socket 35, and the apparatus is again ready to wind wire on the reel. When the winding of wire is completed, the bolt 46 may be removed and the arms 41 and 42 disconnected from the frame whereby the reel and base plate may be separated from the frame and then the structure remaining may be used as a post hole digger by applying an auger to the drive shaft or output shaft of the gear box.

When it is desired to pay out wire from a spool or coil, a coil 72 may be sleeved on a rod 73, and the ends of the rod extended through apertures 74 in the frame arms 8 and 9 with the spool of wire between said arms, as illustrated in FIG. 6. It is preferred that the apertures 74 be slightly forwardly of the forward ends of the brace members 41 and 42. With this arrangement, the end of the wire may be connected to a post or the like, and then, by driving the tractor forwardly, the wire will be payed from the coil 72. This facilitates the stringing of wire along fence posts and avoids the handling of the coil in such operation.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A wire winding attachment for tractors comprising, a frame carried on the rear of a tractor for up and down swinging movement, a gear box pivoted on said frame in spaced relation to the tractor and arranged to turn about a substantially horizontal axis, said gear box having a power input and power output shaft operatively connected thereto, said output shaft depending from said gear box, means for turning said input shaft to rotate said output shaft, a base adapted to rest on the ground below said output shaft, means extending from said base and pivotally connected to said frame in spaced relation to said gear box whereby upon up and down swinging movement of the frame the spacing between the gear box and the base is altered, said base having an upwardly opening socket in substantially vertical alignment with the output shaft, a spindle having a lower end adapted to removably rest in and rotate in said socket, means operatively connecting the upper portion of the spindle with said output shaft to rotate and move therewith, and a reel on said spindle and having upper and lower end members, said lower end member being removably mounted on said spindle whereby upon removal of said lower end member and upward swinging movement of the frame to raise the spindle from the base member wire wound on the reel may be removed therefrom.

2. A wire winding attachment for tractors comprising, a frame carried on the rear of a tractor for up and down swinging movement, a gear box pivoted on said frame in spaced relation to the tractor and arranged to turn about a substantially horizontal axis, said gear box having a power input and power output shaft operatively connected thereto, said output shaft depending from said gear box, means for turning said input shaft to rotate said output shaft, a base adapted to rest on the ground below said output shaft, means extending from said base to said frame and having a pivotal connection whereby upon up and down swinging movement of the frame the elevation of the gear box relative to the base is altered, a spindle having a lower end adapted for rotatable support by said base, means operatively connecting the upper portion of the spindle with said output shaft to rotate and move therewith, a reel on said spindle and having upper and lower end members, said lower end member being removably mounted on said spindle, and circumferentially spaced reel core members having ends connected relative to said end members and spaced from said spindle, said core members being swingable toward said spindle upon removal of the lower end member therefrom and upward swinging movement of the frame to raise the spindle from said base member whereby said core members will converge toward the lower portion of the spindle for sliding a coil of wire from around said reel and spindle.

3. A wire winding attachment for tractors comprising, a frame carried on the rear of a tractor for up and down swinging movement, a gear box pivoted on said frame in spaced relation to the tractor and arranged to turn about a substantially horizontal axis, said gear box having a power input and power output shaft operatively connected thereto, said output shaft depending from said gear box, means for turning said input shaft to rotate said output shaft, a base adapted to rest on the ground below said output shaft, means extending from said base and pivotally connected to said frame whereby upon up and down swinging movement of the frame the elevation of the gear box relative to the base is altered, a spindle having a lower end adapted for removable rotatable support by said base, means operatively connecting the upper portion of the spindle with said output shaft to rotate and move therewith, a reel on said spindle and having upper and lower end members, said lower end member being removably mounted on said spindle whereby upon removal of said lower end member and elevation of the spindle by upward swinging movement of said frame wire wound on the reel may be removed therefrom, a wire guide spaced rearwardly of the reel, means on the frame mounting said wire guide whereby it moves up and down relative to said reel, and means connected to said wire guide for actuation by an operator to effect the up and down movement of the guide for spooling wire across the reel as it is wound thereon.

4. A wire reeling attachment for tractors comprising, a frame carried on the rear of a tractor for up and down swinging movement, said frame comprising a pair of laterally spaced coplanar arms having their forward ends pivoted to the tractor, means connecting the rear ends of the arms, a gear box between the rear portions of said arms and pivotally supported relative thereto to turn about a horizontal axis, said gear box having a power input shaft and a power output shaft operatively connected therein, said power output shaft depending from the gear box, means for turning said input shaft and thereby rotating the output shaft, a base adapted to rest on the ground below said output shaft, means extending from said base and pivotally connected to said frame whereby upon up and down swinging movement of the frame the elevation of the gear box relative to the base is altered, said base having an upwardly opening socket in substantially vertical alignment with the output shaft, a spindle having a lower end adapted to removably rest in and rotate in said socket, means operatively connecting the upper portion of the spindle with said output shaft to rotate and move therewith, and a reel on said spindle and having upper and lower end members, said lowered end member being removably mounted on said spindle whereby on removal of said lower end member and elevation of the spindle from said base member by upward swinging movement of said frame wire wound on the reel may be removed therefrom.

5. A wire winding attachment for tractors comprising, a frame carried on the rear of a tractor for up and down swinging movement, a gear box pivoted on said frame in spaced relation to the tractor and arranged to turn about a substantially horizontal axis, said gear box having a power input and power output shaft operatively connected thereto, said output shaft depending from said gear box, means for turning said input shaft to rotate said output shaft, a base adapted to rest on the ground below said output shaft, arms pivotally connecting said base to said frame whereby upon up and down swinging movement of the frame the elevation of the gear box relative to the base is altered, said base having an upwardly opening socket in substantially vertical alignment with the output shaft, a spindle having a lower end adapted to removably rest in and rotate in said socket, means operatively connecting the upper portion of the spindle with said output shaft to rotate and move therewith, a reel on said spindle and having upper and lower end members, outwardly diverging fingers on said reel end members, said lower end member being removably mounted on said spindle, and circumferentially spaced rods having ends connected relative to said end members and spaced from said spindle, said rods being swingable toward said spindle upon removal of the lower end member therefrom whereby upon upward swinging movement of the frame to raise the spindle from said base member said rods will converge toward the lower portion of the spindle for sliding a coil of wire from around said reel and spindle.

6. A wire winding attachment for tractors comprising, a frame carried on the rear of a tractor for up and down swinging movement, a gear box pivoted on said frame in spaced relation to the tractor and arranged to turn about a substantially horizontal axis, said gear box having power input and power output shaft operatively connected thereto, said output shaft depending from said gear box, means for turning said input shaft to rotate said output shaft, a base adapted to rest on the ground below said output shaft, arm means extending from said base member and connected to said frame in spaced relation to the gear box whereby upon up and down swinging movement of the frame the spacing between the gear box and the base is altered, said base having an upwardly opening socket in substantially vertical alignment with the output shaft, a spindle having a lower end adapted to removably rest in and rotate in said socket, means operatively connecting the upper portion of the spindle with said output shaft to rotate and move therewith, a reel on said spindle and having upper and lower end members, outwardly diverging fingers on said reel end members, said lower end member being removably mounted on said spindle, circumferentially spaced rods having ends connected relative to said end members and spaced from said spindle, said rods being swingable toward said spindle upon removal of the lower end member therefrom whereby said rods will converge toward the lower portion of the spindle and upon elevation of the spindle by upward swinging movement of the frame a coil of wire on the reel will slide from around the reel and spindle, a wire guide spaced rearwardly of the reel, a lever connected to said wire guide and extending upwardly and forwardly thereof, means on the frame pivotally mounting said lever for swinging movement of said wire guide whereby it moves up and down relative to said reel, and means connected to said lever for actuation by an operator to effect the up and down movement of the guide for spooling wire across the reel as it is wound thereon.

7. A wire reeling attachment for tractors comprising, a frame carried on the rear of a tractor for up and down swinging movement, said frame comprising a pair of laterally spaced coplanar arms having their forward ends pivoted to the tractor, means connecting the rear ends of the arms, a gear box between the rear portions of said arms and pivotally supported relative thereto to turn about a horizontal axis, said gear box having a power input shaft and a power output shaft operatively connected therein, said power output shaft depending from the gear box, means for turning said input shaft and thereby rotating the output shaft, a base adapted to rest on the ground below said output shaft, arms pivotally connected to said base and extending therefrom, said arms being connected to said frame whereby upon up and down swinging movement of the frame the elevation of the gear box relative to the base is altered, said base having an upwardly opening socket in substantially vertical alignment with the output shaft, a spindle having a lower end adapted to removably rest in and rotate in said socket, means operatively connecting the upper portion of the spindle with said output shaft to rotate and move therewith, a reel on said spindle and having upper and lower end members, outwardly diverging fingers on said reel end members, said lower end member being removably mounted on said spindle, and circumferentially spaced rods having ends connected relative to said end members and spaced from said spindle, said rods being swingable toward said spindle upon removal of the lower end member therefrom whereby said rods will converge toward the lower portion of the spindle and upon elevation of the spindle by upward swinging movement of the frame a coil of wire on said reel will slide therefrom.

8. A wire reeling attachment for tractors comprising, a frame carried on the rear of a tractor for up and down swinging movement, said frame comprising a pair of laterally spaced coplanar arms having their forward ends pivoted to the tractor, means connecting the rear ends of the arms, a gear box between the rear portions of said arms and pivotally supported relative thereto to turn about a horizontal axis, said gear box having a power input shaft and a power output shaft operatively connected therein, said power output shaft depending from the gear box, means for turning said input shaft and thereby rotating the output shaft, a base adapted to rest on the ground below said output shaft, arm means extending from said base member and pivotally connected to said frame whereby upon up and down swinging movement of the frame the elevation of the gear box relative to the base is altered, said base having an upwardly opening socket in substantially vertical alignment with the output shaft, a spindle having a lower end adapted to removably rest in and rotate in said socket, means operatively connecting the upper portion of the spindle with said output shaft to rotate and move therewith, a reel on said spindle and having upper and lower end members, outwardly diverging fingers on said reel end members, said lower end member being removably mounted on said spindle, circumferentially spaced rods having ends connected relative to said end members and spaced from said spindle, said rods being swingable toward said spindle upon removal of the lower end member therefrom whereby said rods will converge toward the lower portion of the spindle and upon elevation of the spindle by upward swinging movement of the frame a coil of wire on said reel will slide therefrom, a wire guide spaced rearwardly of the reel, a lever connected to said wire guide and extending upwardly and forwardly thereof, means on the frame pivotally mounting said lever for swinging movement of said wire guide whereby it moves up and down relative to said reel, and means connected to said lever for actuation by an operator to effect the up and down movement of the guide for spooling wire across the reel as it is wound thereon.

References Cited in the file of this patent
UNITED STATES PATENTS

| | | |
|---|---|---|
| 402,004 | Day | Apr. 23, 1889 |
| 763,340 | Brandon | June 21, 1904 |
| 2,090,445 | Fultz et al. | Aug. 17, 1937 |
| 2,823,873 | Peterson | Apr. 9, 1954 |
| 2,704,191 | Schley et al. | Mar. 15, 1955 |
| 2,834,574 | Sentman | May 13, 1958 |
| 2,914,270 | Parker et al. | Nov. 29, 1959 |